United States Patent [19]
Beakes et al.

[11] Patent Number: 5,867,892
[45] Date of Patent: Feb. 9, 1999

[54] METHOD AND APPARATUS FOR ROTATIONALLY ORIENTING AN ARMATURE SHAFT

[75] Inventors: John M. Beakes, Fairborn; Mark T. Heaton, Springfield; Gregory S. Garmann, Maria Stein; John W. Bradfute, Xenia; Gary E. Clemenz, Bellbrook, all of Ohio

[73] Assignee: Globe Products Inc., Huber Heights, Ohio

[21] Appl. No.: 795,829

[22] Filed: Feb. 6, 1997

Related U.S. Application Data

[63] Continuation of Ser. No. 516,459, Aug. 17, 1995, abandoned.
[51] Int. Cl.[6] .................................................. H02K 15/02
[52] U.S. Cl. .............................. 29/732; 29/597; 29/598; 29/714; 29/733; 414/754
[58] Field of Search ........................... 29/732, 733, 714, 29/718, 597, 598; 414/754

[56] References Cited

U.S. PATENT DOCUMENTS

| | | | |
|---|---|---|---|
| 2,090,803 | 4/1937 | Moore | 73/51 |
| 2,953,923 | 9/1960 | Moore | 73/466 |
| 3,204,739 | 9/1965 | Moore | 192/139 |
| 4,577,399 | 3/1986 | Ott | 29/733 |
| 5,500,993 | 3/1996 | Beakes et al. | 29/597 |

OTHER PUBLICATIONS

See accompanying Information Disclosure Statement regarding prior art shaft orienting apparatus.
1993–94 Positioning Control Systems and Devices catalog published by Parker Compumotor, Rohnert Park California, admitted to be prior art.

*Primary Examiner*—Carl E. Hall
*Attorney, Agent, or Firm*—Roger S. Dybvig

[57] ABSTRACT

An armature shaft having an eccentric cam body extending from one end thereof is gripped by an adjustable collet mechanism and rotated by a drive motor, preferably a stepping motor, having an output shaft movable in discrete increments. This rotation continues until an imaginary reference point on the periphery of the cam body reaches first and second angular positions. The preferred reference point is the point on the periphery of the end face of the cam body that is farthest from the axis of rotation of the armature shaft. The number of steps necessary to rotate the armature shaft so that the reference point is moved from the first angular position to the second angular position is determined as the armature shaft is rotated and used to determine the position of the reference point relative to a centerline between the first and second angular positions. Thereafter, the armature shaft is rotated from the second angular position by a number of steps computed by a programmable controller which controls the motor so that the cam body has the desired angular orientation relative to the axis of rotation of the armature shaft. After the shaft is oriented, the collet mechanism is moved, without disturbing the angular orientation of the shaft, to align the oriented shaft with a central aperture in a stack of lamination. Thereafter, the oriented shaft is inserted into the stack of laminations.

26 Claims, 4 Drawing Sheets

METHOD AND APPARATUS FOR ROTATIONALLY ORIENTING AN ARMATURE SHAFT

This application is a continuation of application Ser. No. 08/516,459, filed Aug. 17, 1995, now abandoned.

FIELD OF THE INVENTION

This invention relates to a method and apparatus for rotationally orienting the shaft of an electric motor armature and, more particularly, to a method and apparatus for rotationally orienting an armature shaft having an axially extending eccentric cam body integrally formed thereon.

BACKGROUND OF THE INVENTION

During the manufacture of an electric motor armature, an armature shaft and lamination assembly machine is used to press an armature shaft into an aperture in the middle of a stack of slotted laminations made from iron or other metal and that form the core of the armature. Armature shafts are normally formed as solid round rods so that there is typically no concern with regard to the rotational position of the armature shaft about its axis. Certain armature shafts have integrally-formed eccentric cam bodies extending axially from one of their ends. To assist in balancing such an armature shaft to avoid excessive vibration during use, it can be useful to control the rotational orientation of the armature shaft relative to the rotational orientation of the stack of laminations. A prior method and apparatus used to rotationally orient armature shafts having an eccentric cam body extending from one end thereof is found in commonly-owned U.S. Pat. No. 5,500,993.

SUMMARY OF THE INVENTION

An object of this invention is to provide a method and an apparatus for rotationally orienting an armature shaft having an eccentric cam body extending from one end thereof preparatory to assembling the armature shaft with a stack of laminations. An object ancillary thereto is to provide a method and an apparatus for quickly and accurately rotationally orienting such armature shafts.

A further object of this invention is to provide a method and an apparatus for rotationally orienting an armature shaft having an eccentric cam body extending from one end thereof which are capable of meeting stricter tolerance standards than known methods and apparatus.

Yet another object of this invention is to provide a method and apparatus capable of accurately orienting an armature shaft in a short period of time.

Another object of this invention is to provide a method and apparatus for stabilizing the armature shaft during the orientation process.

Still another object of this invention is to provide a method and apparatus for rotationally orienting an armature shaft wherein the shaft may be positioned for insertion into a stack of laminations without being removed from the orienting apparatus. An object ancillary thereto is to provide a method and apparatus wherein the shaft does not move from the desired orientation while the shaft is being positioned for insertion into the lamination stack.

It may be thought possible to orient an armature shaft simply by rotating it until a reference point on the armature shaft is detected by a proximity detector. However, small differences in the shapes, sizes, or eccentricities of the cam bodies on the armature shafts, which may be within acceptable tolerance limits, can cause substantial differences between the expected detected location of the reference point and the actual detected location of the reference point. The latter difference can be so significant that the actual orientation of a shaft is unacceptably offset from the desired orientation of the shaft.

In accordance with the method of this invention, an armature shaft is rotated about its axis in a predetermined (clockwise or counterclockwise) direction by a stepping motor so that an imaginary reference point on the cam body at the end of the armature shaft is sensed by a proximity detector to be located at a first angular position and, by continued operation of the stepping motor, the armature shaft continues to rotate in the same predetermined direction until the same reference point is sensed by a proximity detector to be located at a second angular position, at which time the stepping motor is temporarily deenergized and the armature shaft is temporarily stationary. The first angular position and the second angular position are substantially equidistant and on opposite sides of a imaginary centerline passing through the center of the armature shaft, which is preferably a vertical centerline, i.e., from the 12:00 o'clock to the 6:00 o'clock positions. However, it will be readily apparent that other centerlines could be selected. The preferred reference point is the point on the periphery of the cam body that is farthest from the axis of rotation of the armature shaft. (As will become apparent, in the embodiment illustrated herein, the reference point is also the point on the cam body radially closest to the outer surface of the armature shaft, and in particular, the reference point is coplanar with an axially extending imaginary line on the outer surface of the armature shaft.)

Although the reference points are expected to be detected when located at predetermined first and second angular positions, the reference points may actually be located at different positions due to the detection method and small differences in the sizes, shapes, and eccentricities of the armature shaft cam bodies. In order to determine the precise location of a reference point after it is detected to be located at the second angular position, a programmable controller, which controls the operation of the stepping motor, memorizes the number of motor steps needed to move the reference point from the orientation thereof at which it is detected, with some uncertainty, at the first position to the position at which it is detected, again with some uncertainty, at the second predetermined angular position. During the interval in which the motor is temporarily deenergized, the programmable controller calculates one half of the memorized number of motor steps required to rotate the armature shaft from the first position to the second position. In effect, this calculation determines the number of motor steps that would be required to reversely rotate the motor shaft from the stopped position thereof to the position at which the reference point would be aligned with the vertical centerline of the motor shaft which is equidistant and between the first and second positions. This indication may not be entirely precise due to inaccuracies introduced by the manner in which the reference point locations are sensed. However, a correction factor, which can be predetermined by trial and error, can be included in the computations by the programmable controller in order to enable a highly precise indication of the angular position of the reference point.

In view of the fact that the angular orientation of the reference point, when detected to be at the second position, can be computed as described above, the programmable controller can, by simple calculations, determine how many motor steps the armature shaft should be rotated in order to achieve the final desired orientation of the armature shaft relative to the vertical centerline. Thus, the programmable controller algebraically computes the required number of motor steps to rotate the armature shaft to its final oriented position, which required number of steps is based on the number of motor steps required to move the reference point to the vertical centerline, the correction factor to account for inaccuracies introduced by the detection method, and the number of motor steps that would be required to rotate the armature shaft, if the reference point were at the vertical centerline, to its final, oriented position. In practice, however, it is preferred to rotate the armature shaft in one direction only, so as to avoid errors that might result from backlash effects. Such unidirectional rotation is taken into account by the programmable controller during computation of the required number of motor steps.

Preferably, the shaft is placed in a rotatable collet mechanism biased to grip the shaft. The output shaft of the stepping motor is drivingly connected to the collet mechanism to rotate the collet mechanism and the shaft gripped thereby. A detecting mechanism located adjacent the collet mechanism detects when the reference point on the periphery of the cam body reaches the first and second angular positions. The detecting mechanism preferably includes a pivotable L-shaped arm located adjacent the collet mechanism and has a first portion at least transiently contacted by the cam body when the shaft is received in the collet mechanism. The arm is pivoted by the cam body when the shaft is rotated. A proximity switch located remotely from the first portion and adjacent a second portion of the L-shaped arm detects vertical movement of the reference point on the periphery of the cam body and indicates when the reference point reaches the first and second angular positions.

To stabilize the shaft during the orientation process, a shaft placing push rod is maintained in engagement with the armature shaft during the orientation process. The push rod has a projection that is received in a depression in the end of the cam body.

The apparatus may also include a rotatable shaft placing arm and a movable carriage mounted on the shaft placing arm that carries the collet mechanism and the stepping motor. After the shaft is oriented, the shaft placing arm is rotated, while maintaining the orientation of the shaft, to a vertical position wherein the shaft is aligned with a central aperture of a stack of laminations. Thereafter, the oriented shaft is inserted into the stack of laminations.

Other objects and advantages will become apparent from the following description and the drawings.

DETAILED DESCRIPTION

Figure 1:
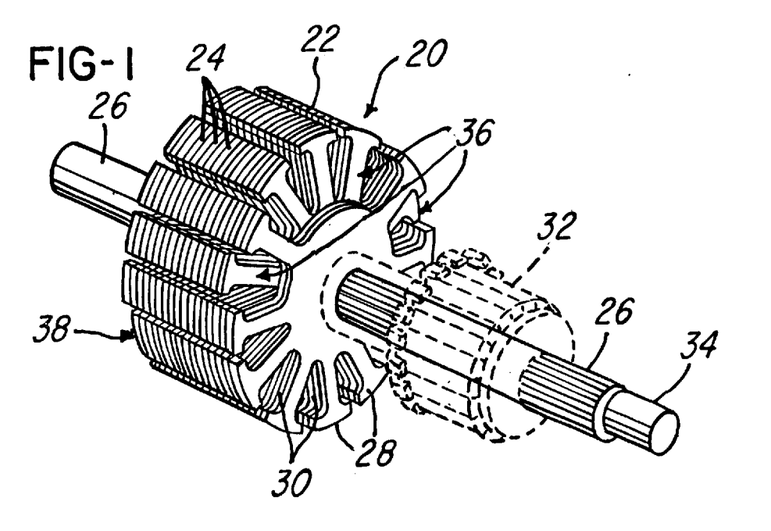
FIG. 1 is a perspective view of an armature core assembly which includes an armature shaft of the type with which this invention may be used.

FIG. 1 illustrates a partially manufactured electric motor armature, generally designated 20, having a core 22 made from a stack of slotted laminations 24 made from iron or other metal assembled on an armature shaft 26. Each of the laminations has plural teeth 28 separated by coil-receiving slots 30. At a later stage of manufacture, so called "end fibers" or end laminations (not shown) made from an insulating plastic material and a commutator 32 (shown by phantom lines) are also pressed on the armature shaft 26. The illustrated armature shaft 26 has an eccentric cam body 34 extending from its end adjacent the commutator 32. The cam body 34 is offset from the axis of rotation of the armature shaft 26, which axis is coincident with the center axis of the core 22. In operation of the completed armature (not shown), the offset location of the cam body 34 creates a balance problem. This problem can be partly alleviated by forming one or more of the metal laminations 24 nearest the commutator 32 to asymmetrical shapes such that radially outermost parts of several of the teeth 28 thereof are removed or missing. The incomplete teeth 28 are generally diametrically opposite the cam body 34, thus leaving gaps 36 in the end laminations. There may also be one or more laminations on the opposite end of the core 22 which are incomplete, as shown by gaps 38.

During manufacture of the armature 20, it is necessary to obtain and maintain a particular angular orientation of the armature shaft 26 relative to the core 22. With reference to FIGS. 2 through 5, an apparatus for such purpose in accordance with this invention is generally designated 40 and includes a shaft placing arm 42, a movable carriage assembly 44 mounted on the shaft placing arm 42, a shaft orienting assembly 46 mounted on the carriage, and a detector assembly 48 located adjacent the shaft placing arm 42.

Generally, in operation of the apparatus 40, the armature shaft 26 is inserted into the orienting assembly 46 which, as will be described below, rotates the armature shaft 26 so that the cam body 34 has the desired angular orientation relative to the axis of rotation of the armature shaft 26. Shaft placing arm 42 is then pivoted to a vertical position, shown in phantom lines in FIG. 3, whereby the armature shaft 26 is vertically aligned with a central aperture 50 of a lamination stack 52. The carriage 44 is then moved vertically downward until splines 54 on the end of the armature shaft 26 engage the aperture 50. Thereafter, the piston 56 of a shaft placing cylinder, shown diagrammatically in FIG. 2 at 58, located above the vertically positioned shaft placing arm 42 is extended downwardly to engage the armature shaft 26 to fully insert the armature shaft 26 into the aperture 50.

Figure 2:
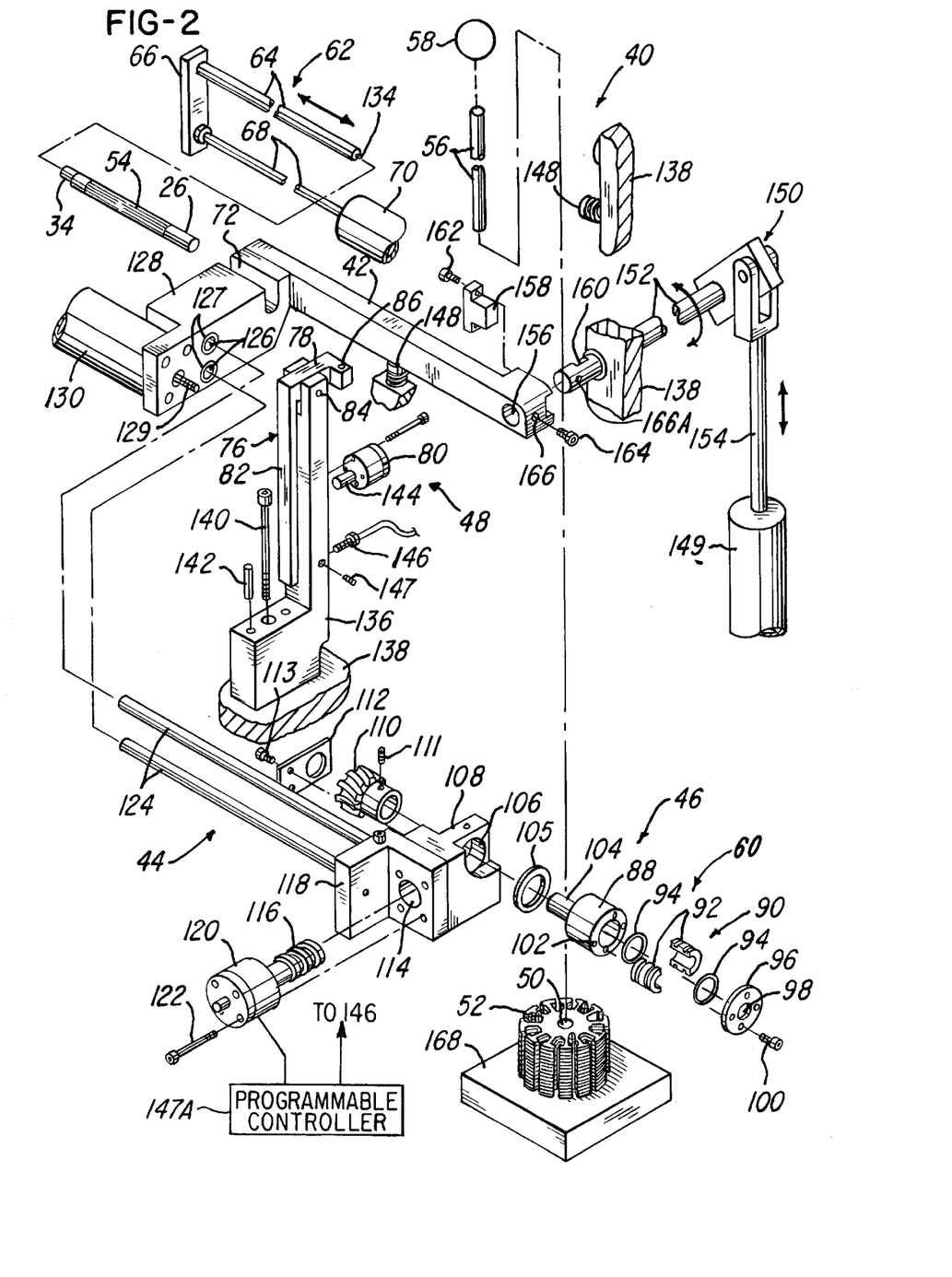
FIG. 2 is a fragmentary, exploded, partially diagrammatic, perspective view of a shaft orienting apparatus in accordance with this invention.

Referring now to FIG. 2, the armature shaft 26 is initially placed in a shaft tray (not shown) by a shaft placing mechanism (not shown). Because the shaft tray and shaft placing mechanism may be entirely conventional and form no part of applicants' invention, they are not described in detail herein. When placed in the shaft tray, the armature shaft 26 is generally aligned with a central aperture of a collet mechanism 60, which forms part of the orienting assembly 46 of this invention, such that the cam body 34 is most remote from the collet mechanism 60. Armature shaft 26 is inserted into the collet mechanism 60 by an air operated shaft insertion mechanism, generally designated 62. Shaft insertion mechanism 62, which is located adjacent the shaft placing arm 42 and the collet mechanism 60, comprises an elongate push rod 64 attached to a connecting plate 66 which is connected to the end of a piston 68 of an air actuator 70. Actuator 70 is operated to retract the piston 68, thereby drawing the push rod 64 into engagement with the cam body 34. Piston 68 is further retracted to push the armature shaft 26 into the aperture of the collet mechanism 60.

As best seen in FIG. 2, the armature shaft 26 is pushed through a notch 72 in the shaft placing arm 42. However, a detector assembly 48 also located adjacent the shaft placing arm 42 and the collet mechanism 60 interferes with the insertion of the armature shaft 26 into the collet mechanism 60 when the detector assembly 48 is in its operative position. The details of the detector assembly 48 will be described in detail below, but briefly, the detector assembly 48 includes a pivotable L-shaped arm 76. In its operative position, the short or first portion 78 of the L-shaped arm 76 is in confronting alignment with part of the armature shaft 26 as the armature shaft 26 is pushed through the notch 72.

Figures 3, 4, 5:
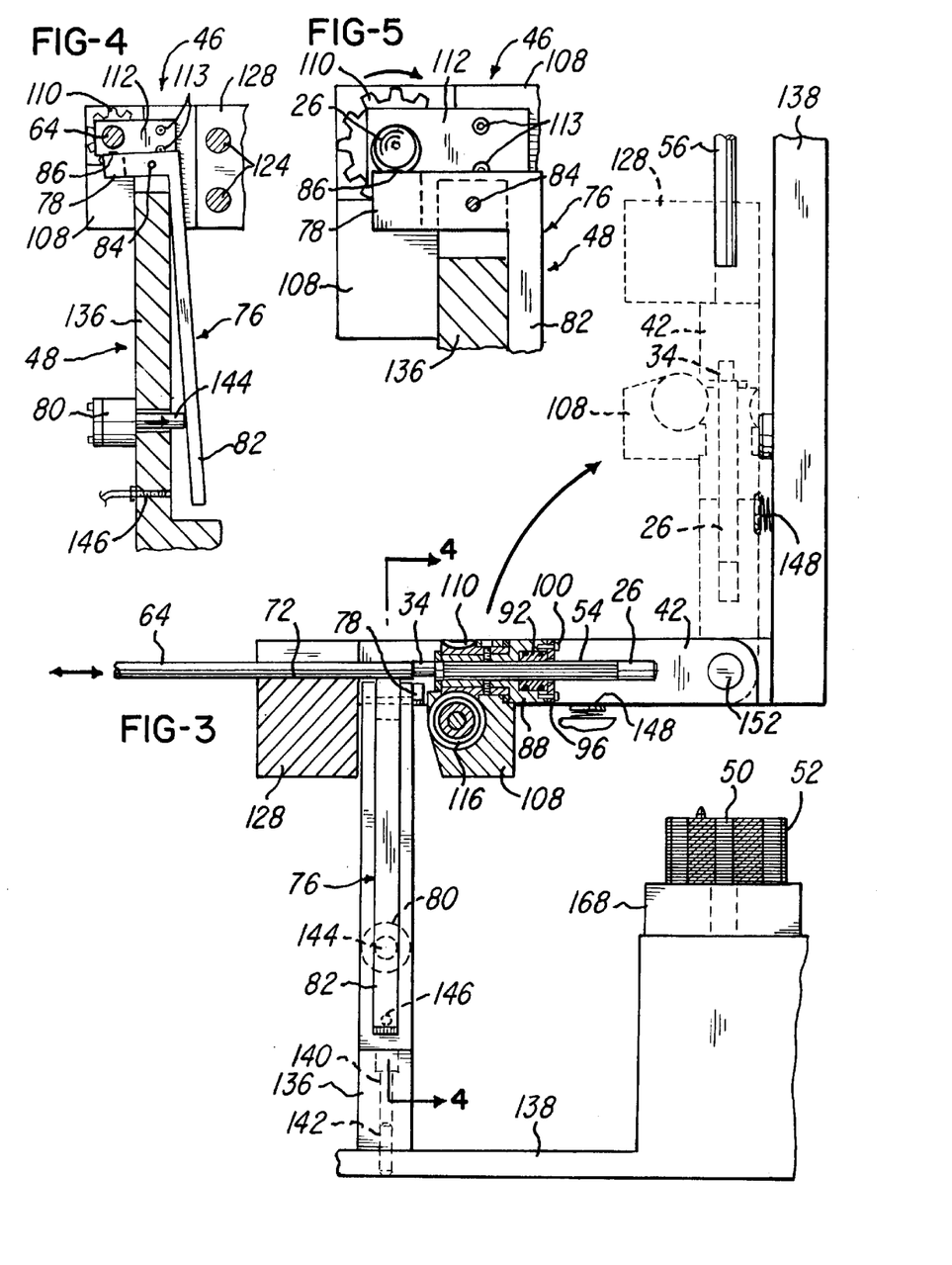
FIG. 3 is a fragmentary, side elevational view, with parts shown in cross-section, of the apparatus of FIG. 2.
FIG. 4 is a fragmentary, cross-sectional view taken along line 4—4 of FIG. 3 showing the detector assembly and the shaft orienting assembly and further showing the L-shaped arm of the detector assembly pivoted to an out-of-the-way position.
FIG. 5 is an enlarged, fragmentary, cross-sectional view of the portion of the apparatus shown in FIG. 4.

As best shown in FIG. 4, an air actuator 80, which engages and moves the longer or second portion 82 of the arm 76, is energized to remove the aforementioned interference. As actuator 80 moves the second portion 82 of the arm 76, the arm 76 is pivoted about a pivot pin 84, and thus the first portion 78 of the arm 76 is rotated from its position in confronting alignment with part of the armature shaft 26, and the armature shaft 26 may be freely pushed by the push rod 64 toward the aperture in the collet mechanism 60. Armature shaft 26 is pushed by the push rod 64 until the cam body 34 is directly over a wear pad 86 on the first portion 78 of the L-shaped arm 76.

Once the armature shaft 26 is inserted into the collet mechanism 60, the actuator 80 is reversed so that the arm 76 reversely pivots to its operative position, which will be described below. Actuator 70 may also be operated to extend the piston 68 so that the push rod 64 is moved away from the armature shaft 26. However, in the preferred embodiment, the push rod 64 is not retracted, but is maintained in constant contact with the end of the armature shaft 26 during the orientation process for reasons which will be described below.

Referring again to FIG. 2, the collet mechanism 60 is adjustable to accept shafts of various diameters and includes a hollow, cylindrical housing 88 having a gripper assembly 90 fixedly mounted therein. Gripper assembly 90 comprises a pair of grippers 92 each in the shape of one half of a hollow cylinder sliced along a diameter. When placed together, the grippers 92 form a hollow cylinder. To provide adjustability, a pair of O-rings 94 made from a suitable resilient material such as rubber are placed around the outside of the grippers 92 when they are placed together. Thus, when a shaft having a diameter larger than the inside diameter of the gripper assembly 90 is inserted into the collet mechanism 60, the grippers 92 are forced apart by the armature shaft 26. The resilient O-rings 94 bias grippers 92 together so that the armature shaft 26 is gripped by the grippers 92.

With further reference to FIG. 2, an end plate 96 having a central opening 98 is attached to one end of the housing 88 by four threaded bolts 100, only one of which is shown, which are received in tapped bores 102 in the housing 88. End plate 96 serves to retain the gripper assembly 90 within the housing 88. The other end of the housing 88 has a hollow, cylindrical shaft 104 extending therefrom having an outside diameter smaller than that of the housing 88. The inside diameter of the shaft 104 is larger than the inside diameter of the gripper assembly 90 when the O-rings 94 are not stretched so that shafts larger than the smallest diameter of the gripper assembly 92 may be received in the collet mechanism 60. Shaft 104 extends through a bearing 105 and through a cylindrical opening 106 in a carriage block 108, which forms part of the carriage assembly 44. Shaft 104 is secured to a hollow, conventional worm gear 110 by a set screw 111, and a face plate 112 is secured over the end of the worm gear 110. The face plate 112 is attached to the carriage block 108 by a pair of threaded bolts 113, only one of which is shown, and has a circular opening that, as best shown in FIGS. 4 and 5, is aligned with the hollow center of the worm gear 110 to define the central aperture of the collet mechanism 60. As is evident, the circular opening in the plate 112 is also larger in diameter than the inside diameter of the gripper assembly 90.

Carriage block 108 also has a second opening 114 extending through the block 108 perpendicularly to and in open communication with the first-mentioned opening 106. A conventional worm drive 116 extends through the opening 114 and meshes with the worm gear 110 to form a conventional worm gear reducer. Thus, rotation of the worm drive 116 is imparted to the worm gear 110, which rotation is, in turn, imparted to the collet mechanism 60. In the preferred embodiment, the worm gear reducer has a 3:1 ratio, i.e. three complete revolutions of the worm drive 116 results in one revolution of the worm gear 110, and thus, one revolution of the collet mechanism 60.

Worm drive 116 also extends through an opening in an L-shaped mounting block 118, which also forms part of the carriage assembly 44. A stepping motor 120 having its output shaft (not shown) drivingly connected to the worm drive 116 is secured to the mounting block 118 by four threaded bolts 122, only one of which is shown, which extend through corresponding apertures in the mounting block 118 and into corresponding tapped bores in the carriage block 108. Thus, the mounting block 118 and the carriage block 108 are joined to form a portion of the carriage assembly 44.

Stepping motor 120 may be any conventional stepping motor having an output shaft rotatable in controllable, discrete increments. A Microstep Drive, SX Series, available from Parker Compumotor, 5500 Business Park Drive, Rohnert Park, Calif. 94928, is presently preferred. In particular, a Model No. SX57-83 stepping motor is preferred, which provides several user-selectable motor resolutions. A motor resolution of 25,000 discrete steps per rotation is presently preferred so that one rotation of the collet mechanism 60 requires 75,000 discrete steps of the motor 120, as a result of the 3:1 ratio of the worm gear reducer.

Carriage assembly 44, which carries the orienting assembly 46, also includes a pair of cylindrical guide rods 124 connected to and extending from the mounting block 118. Guide rods 124 are slidably received in bushings 127 in guide rod apertures 126 in carriage arm 128 of the L-shaped shaft placing arm 42. Thus, the carriage assembly 44 is slidable toward and away from the carriage arm 128. To affect movement of the carriage assembly 44, an air actuator or cylinder 130 is mounted on the carriage arm 128 adjacent the guide rod apertures 126. The piston 129 of the air cylinder 130 extends through an opening in the carriage arm 128 and is connected to the mounting block 118 of the carriage assembly 44. Thus, when the piston 129 is extended, the carriage assembly 44 slides away from the carriage arm 128. Likewise, when the piston 129 is withdrawn, the carriage assembly 44 slides toward the carriage arm 128. Of course, travel of the piston 129 is limited so that the guide rods 124 are not drawn completely out of the guide rod apertures 126.

In operation of the apparatus 40, the armature shaft 26 is inserted into the orienting assembly 46, as described above, when the piston 129 is completely withdrawn so that the carriage assembly 44 abuts the carriage arm 128. Because the gripper assembly 90 within the collet mechanism 60 is biased by resilient O-rings 94, a certain amount of asymmetric rotation or wobbling of the armature shaft 26 may be present when the armature shaft 26 is rotated along with collet mechanism 60. Any such wobbling could adversely affect the accuracy and reliability of the shaft orientation process described below. Therefore, as mentioned above, it is preferred that the push rod 64 is not withdrawn during the orienting process to stabilize the armature shaft 26. Armature shaft 26 preferably has a small, generally cylindrical depression 132, shown best in FIGS. 6 through 10, formed in the end of the cam body 34, which depression 132 is aligned with the center axis of the armature shaft 26. Further, push rod 64 is formed with a projection 134 extending from the shaft engaging end thereof that is received in the depression 132 when the push rod 64 engages the armature shaft 26. Because the push rod 64 remains extended with the projection 134 in the depression 132, wobbling of the armature shaft 26 is limited during the orientation process. As will become obvious from the following description of the orientation processes, it is preferred that the push rod 64 be smaller in diameter than the shaft to prevent any interference with the orientation process. Regarding the projection 134, it has been found that a projection extending 0.120" and having a diameter of 0.120" performs satisfactorily. In addition, it is preferred that the projection 134 be generally cylindrical for 0.060" of its length. The remainder of the projection 134 is in the shape of a truncated cone with its diameter decreasing toward its free end. Of course, the preferred dimensions of the depression 132 correspond to the preferred dimensions of the projection 134.

With reference to FIGS. 6 through 9, only one imaginary reference point A on the periphery of the illustrated eccentric cam body 34 is aligned with the outer surface of the armature shaft 26. This imaginary reference point A is used to determine the orientation of cam body 34 relative to the axis of rotation of armature shaft 26. Of course, it shall be understood that some shafts may not have a peripheral reference point on the cam body 34 aligned with the outer surface of the armature shaft 26 or that some shafts may have cam bodies that extend beyond the outer surface of the shaft. In all cases, though, the reference point to be used in determining shaft orientation is the peripheral reference point on the cam body 34 radially farthest from the axis of rotation of the armature shaft 26.

Figures 6, 7, 8, 9, 10, 12, 13:
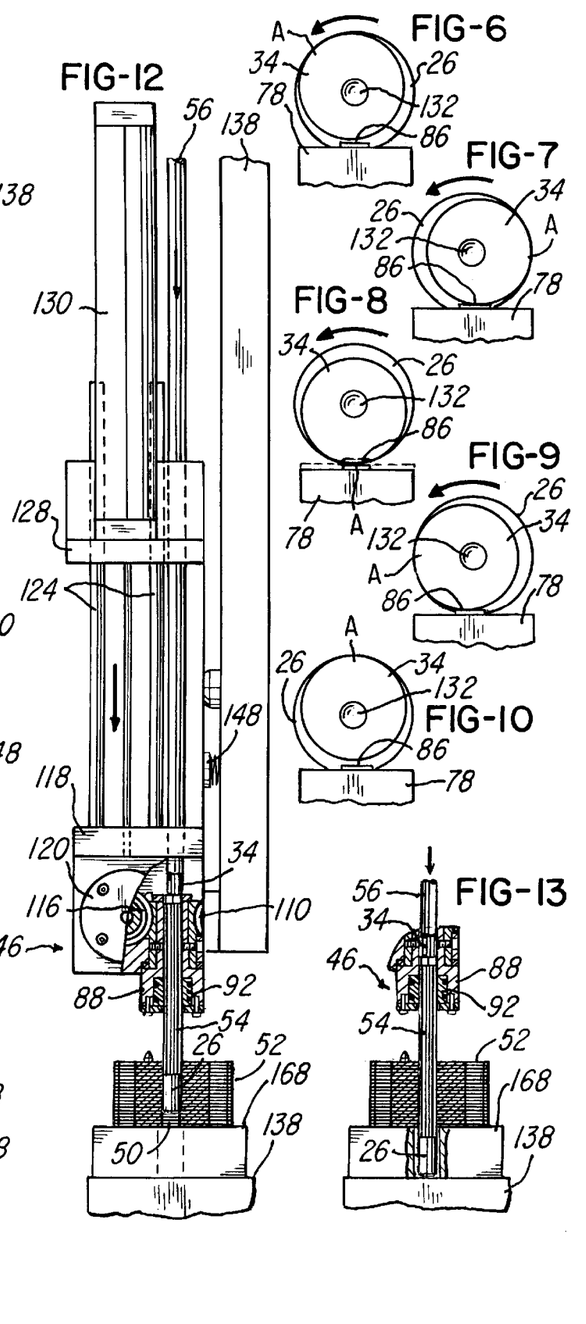
FIG. 6 is a fragmentary, end elevational view of an armature shaft to be oriented and a portion of the detector assembly showing a reference point A on the periphery of the cam body is at an initial, random angular position.
FIGS. 7 through 10 are similar to FIG. 6, but illustrating the position of the armature shaft as it is rotated to locate the reference point A in the desired angular position.
FIG. 12 is a fragmentary, side elevational view similar to FIG. 11, but at a later stage of assembly of the shaft and the lamination stack.
FIG. 13 is a fragmentary, side elevational view, with parts cut away and parts shown in cross-section, showing the final step taken to insert an oriented armature shaft into a stack of laminations.

After the armature shaft 26 is inserted into the orienting assembly 46 and the detector 48 assembly is returned to its operative position, the stepping motor 120 is operated to rotate the collet mechanism 60 and the armature shaft 26 gripped thereby in the counterclockwise direction, as viewed in FIGS. 6 through 9. As described above, the push rod 64 preferably remains engaged with the armature shaft 26 during the orientation process to prevent the wobbling of the armature shaft 26 which would otherwise be present. As the stepping motor 120 rotates the collet mechanism 60 and the armature shaft 26, the detector assembly 48 detects when the reference point A on the cam body 34 reaches the first and second angular positions, as illustrated in FIGS. 9 and 7, respectively.

As best shown in FIGS. 2 through 4, the detector assembly 48 comprises a pivotable L-shaped detector arm 76 which has a first, horizontally-extending portion 78 that is pivotally connected to a vertically-extending support 136 by a pivot pin 84. The support 136 is mounted to a frame 138 by a threaded bolt 140 and a pair of pins 142, only one of which is shown. L-shaped arm 76 also includes a second, longer, vertically-extending portion 82 which extends along the support 136. As indicated above, an actuator 80 is mounted on the support 136 with the piston 144 thereof extending through an opening (not shown) in the support 136. Actuator 80 pivots the L-shaped arm 76 from its operative position to an out-of-the-way position to facilitate insertion of the armature shaft 26 into the orienting assembly 46.

Detector assembly 48 also includes a proximity switch 146 mounted on the support 136 adjacent the end of the second portion 82 of the arm 76, which is remote from the pivot pin 84. Proximity switch 146 is secured to the support 136 by a locking pin 147 and extends through an opening (not shown) in the support 136. The proximity switch 146 may be entirely conventional and the details of the switch 146 form no part of this invention. However, a commercially-available Hall Effect proximity switch which detects objects within 1 mm is presently preferred. The output of the proximity switch 146 is connected to one of the input ports of a programmable controller, shown diagramatically in FIG. 2 at 147A, for the stepping motor 120, for reasons which will be described below in further detail.

The first portion 78 of the arm 76 has small, carbide wear pad 86 attached to its top surface. When the armature shaft 26 is rotated with the collet mechanism 60, the cam body 34 transiently moves into and out of contact with the wear pad 86. Because the surface area of the wear pad 86 is small, only a small, circumferential surface portion of the cam body 34 contacts the wear pad 86 at any given moment. Consequently, the wear pad 86 moves in response to very small movements of the surface of the cam body 34 when the cam body 34 is in contact with the wear pad 86. These movements of the wear pad 86 are pivotally translated to movements of the end of the second portion 82 of the arm 76 which is adjacent the proximity switch 146. Preferably, the length of the first and second portions 78 and 82, respectively, of the arm 76 are such that a 13:1 ratio of movement results, i.e. one unit of movement of the wear pad 86 results in 13 units of movement of the end of the second portion 82 of the arm 76 located adjacent proximity switch 146.

Referring again to FIGS. 6 through 9, FIG. 6 shows the armature shaft 26 in a randomly determined orientation after being inserted into the orienting assembly 46. Of course, it will be recognized that the armature shaft 26 may be inserted into the orienting assembly 46 in any of an infinite number of initial, randomly determined orientations. As the armature shaft 26 is rotated by the stepping motor 120 in the counterclockwise direction, as viewed in FIGS. 6 through 9, the reference point A on the periphery of cam body 34 reaches the first angular position shown in FIG. 9. Given the particular initial orientation of the armature shaft 26 shown in FIG. 6, the cam body 34 first comes into contact with the wear pad 86 when the reference point A reaches the position shown in FIG. 9. However, if the initial orientation of the armature shaft 26 was, for example, as shown in FIG. 8, the cam body 34 would already be in contact with wear pad 86. Regardless of initial orientation, though, the armature shaft 26 is initially rotated until the reference point A on the cam body 34 reaches its position shown in FIG. 9 for the first time.

As the armature shaft 26 is rotated counterclockwise from the position shown in FIG. 9, the cam body 34 engages and pushes downward on the wear pad 86 to pivot the L-shaped arm 76 as described above. As the arm 76 pivots, movement of the wear pad 86 is translated by a 13:1 ratio to the end of the second portion 82 of the arm 76, which moves away from and opens the proximity switch 146. The output of switch 146 is routed to an input port of a programmable motor controller 147A, which is connected to and controls the stepping motor 120. The motor controller 147A may be any conventional, commercially-available programmable controller for stepping motors. However, the controller accompanying the above-described preferred stepping motor, Model No. SX57-83 from Parker Compumotor, is presently preferred. The controller 147A, in response to the opening of the switch 146, begins counting the steps taken by the motor 120.

As the reference point A is rotated counterclockwise from the position shown in FIG. 9, the reference point passes through the position shown in FIG. 8. When the reference point A reaches the position shown in FIG. 7, the second portion 82 of the arm 76 moves into close proximity to the switch 146, and the switch 146 is closed. In response to the closing of the switch 146, the rotation of the armature shaft 26 is stopped and the controller 147A memorizes the number of steps counted as the armature shaft was rotated from the position shown in FIG. 9 to the position shown in FIG. 7.

At this time, while the armature shaft 26 is temporarily stationary, the controller 147A computes the number of motor steps needed to rotate the armature shaft 26 so that the cam body 34 has the desired angular orientation relative to the axis of orientation of the armature shaft 26. First, the controller 147A computes a number of steps equal to 0.5 times the memorized number of steps counted by the controller 147A as described above. This first computed number of steps indicates the angular position of the cam body 34 relative to the vertical centerline, which vertical centerline is equidistant and between the first and second detected angular positions. The controller 147A also adds or subtracts a correction factor to the first computed number of steps. This correction factor can be empirically predetermined and accounts for tolerances in the apparatus such as hysteresis and time delay in the switch 146. Finally, the controller 147A computes a final number of motor steps needed to rotate the shaft so that the cam body 34 has the desired angular orientation relative to the axis of rotation of the armature shaft 26. This final computation consists of adding a predetermined number of motor steps to the previously computed number of motor steps, such predetermined number of motor steps being equal to the number of motor steps needed to rotate the reference point A from the vertical centerline position to its desired angular position. Preferably, the programmable controller 147A is so programmed that the armature shaft is rotated in only one direction and, in addition, so that the armature shaft is rotated through not more than 360 degrees from the second angular position to its final position.

The foregoing describes the preferred method for orienting the armature shaft 26. However, it will be recognized that various modifications may be made in accordance with this invention. For example, the armature shaft 26 may be rotated clockwise, rather than counterclockwise. In addition, a reverse rotation of the armature shaft 26 may be included, although such reverse rotation will likely result in an undesired mechanical backlash. It will also be recognized that the above-described method and appraratus may be used with cam bodies having various different shapes, so long as there is one point on the periphery of the cam body that is radially farthest from the axis of rotation of the armature shaft. Any necessary changes to the apparatus or the motor controller 147A to affect such modifications will be readily apparent to one skilled in the art.

Figure 11:
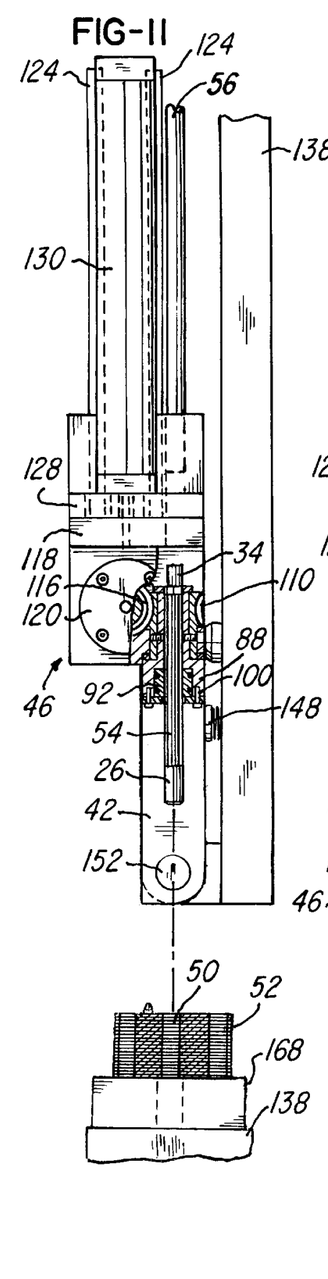
FIG. 11 is a fragmentary side elevational view, with parts cut away and parts shown in cross-section, of the apparatus of FIG. 2 showing the shaft placing arm pivoted to its vertical position to vertically align the oriented shaft with the central aperture of a lamination stack.

With reference to FIGS. 3 and 11, after the armature shaft 26 has been rotationally oriented, the shaft placing arm 42 is rotated from its initial horizontal position, as shown in FIG. 3 in full lines, to its vertical position, as shown in FIG. 3 in phantom lines and also shown in FIGS. 11 and 12 in full lines. As the shaft placing arm 42 reaches its vertical position, it engages a spring-biased shock absorber 148 that cushions the braking of the arm 42. Shock absorber 148 protects the components of the orienting assembly 46 from jolts or shocks upon braking and helps to prevent relative movement between the collet mechanism 60 and the armature shaft 26 gripped thereby. Also with reference to FIG. 2, the shaft placing arm 42 is rotated to its vertical position by an air cylinder 149 that is connected by a clevis-type connection 150 to a rotatable shaft 152. When the piston 154 of the air cylinder 149 is withdrawn, the linear movement of the piston 154 is translated into rotational movement of the shaft 152 by the clevis-type connection 150 so that the shaft placing arm is rotated to its vertical position. Likewise, extension of the piston 154 causes the shaft placing arm 42 to be rotated to its horizontal position.

With further reference to FIG. 2, the shaft placing arm 42 has a cylindrical opening 156 that accepts the end of the rotatable shaft 152. The rotatable shaft 152 is fixedly connected to the shaft placing arm 42 by a key 158 that is fitted into a notch or keyway 160 in the shaft 152 and is secured to the shaft placing arm 42 by a pair of threaded bolts 162, only one of which is shown. In addition to the key 158, the shaft placing arm 42 is also secured to the shaft 152 by a screw 164 which passes through the end of the shaft placing arm 42 and into a tapped bore 166 on the shaft 152.

Referring now to FIGS. 11 through 13, after the shaft placing arm 42 is moved to its vertical position, the carriage assembly 44 is lowered by extension of the piston 129 of air actuator 130 so that the splines 54 on the armature shaft 26 engage and "stall" on the central aperture 50 in the lamination stack 52. Thereafter, the piston 56 of a conventional shaft placing cylinder 58 is extended downwardly to "seat" the shaft splines 54 into the lamination stack 52. The piston 56 engages the end of the armature shaft 26 and pushes the armature shaft 26 into the aperture 50. While the armature shaft 26 is being pushed downward into the aperture 50, the carriage 44 will move slightly downward with the armature shaft 26.

With the piston 56 of the shaft placing cylinder 58 fully extended, the actuator 130 is operated to retract the carriage 44 from its lowered position. As carriage 44 is raised, the collet mechanism 60 and, in particular, the grippers 92, slide over the armature shaft 26 as the armature shaft 26 remains positioned in the aperture 50 of the lamination stack 52. Accordingly, the armature shaft 26 and the lamination stack 52 are not lifted when the carriage 44 is raised. Here it should be noted that the bias provided by the O-rings 94 is sufficient to tightly grip the armature shaft 26 during the orientation process and the initial shaft placing process, but the bias is not so great that the grippers 92 will not slide over the shaft when the carriage is raised as described above. It should also be noted here that throughout this operation, no rotational movement has occurred between the armature shaft 26 and the collet mechanism 60.

After the carriage 44 is retracted, the shaft placing arm 42 is rotated to its initial horizontal position and the orienting assembly 46 is ready to accept another armature shaft 26 to be oriented. As with the rotation of the shaft placing arm 42 to its vertical position, a shock absorber 148 is also provided to cushion the braking of the arm 42 when it is reversely rotated to its horizontal position. In the meantime, the completed lamination stack and shaft assembly is removed from the lamination support 168, for example, by a conventional pick-and-place mechanism (not shown) and a new lamination stack 52 is placed onto the support 168.

It should be noted that it is often necessary to rotationally orient the lamination stack 50 prior to insertion of the oriented armature shaft 26 therein. A known method of orienting a lamination stack prior to shaft insertion is disclosed in the aforementioned U.S. Pat. No. 5,500,993.

The method and apparatus of this invention are capable of locating the cam body 34 within two degrees of the desired angular position in a short time of approximately six to seven seconds. By monitoring two diametrically opposed positions of the cam body 34, the method and apparatus of this invention eliminate previous tolerance problems that arise from variations in the shape, size or eccentricity of the cam body 34.

Although the presently preferred embodiments of this invention have been described, it will be understood that within the purview of the invention various changes may be made within the scope of the following claims.

Having thus described our invention, we claim:

1. A method for rotationally orienting an armature shaft having an eccentric cam body extending axially from one end thereof so that said cam body has a desired angular orientation relative to the axis of rotation of said shaft, comprising:

rotating said armature shaft, using a motor having an output shaft movable in discrete increments or steps, until an imaginary reference point on the periphery of said cam body is at a first angular position;

further rotating said armature shaft gripped thereby using said motor until said reference point is at a second angular position;

determining the number of motor steps necessary to rotate said armature shaft so that said reference point moves from said first angular position to said second angular position;

determining the number of motor steps needed to rotate said armature shaft so that said reference point moves from said second angular position to said desired angular orientation by steps including:

calculating one half the number of motor steps determined by the immediately preceding step to define the position of said reference point relative to a centerline equidistant and between said first and second angular positions, and adding thereto the number of motor steps needed to rotate said shaft from said centerline to said desired angular orientation.

2. The method of claim 1 further comprising placing said shaft in a rotatable collet mechanism biased to grip said shaft, and wherein said rotating steps comprise rotating said collet mechanism and said shaft gripped thereby.

3. The method of claim 1 further comprising detecting when said reference point reaches said first and second angular positions.

4. The method of claim 1 wherein said reference point is the point on the periphery of said cam body radially farthest from the axis of rotation of said armature shaft.

5. The method of claim 4 wherein said reference point is substantially coplanar with a portion of the outer surface of said shaft.

6. The method of claim 1 wherein said second angular position is substantially 180 degrees opposite said first angular position.

7. The method of claim 3 further comprising providing a detecting mechanism comprising:

a pivotable L-shaped arm having a first portion at least transiently contacted by said cam body, said arm being pivoted by said cam body when said armature shaft is rotated; and a proximity switch located remote from said first portion of said arm and adjacent a second portion of said arm; and wherein said detecting steps comprise monitoring the proximity of said second portion of said arm to said switch as said arm is pivoted by said cam body.

8. The method of claim 7 wherein the end of said second portion of said L-shaped arm adjacent said proximity switch is pivoted away from and toward said proximity switch by said cam body when said shaft is rotated between said first position and said second position and wherein the ratio of (a) pivotal movement of the end of said second portion adjacent said proximity switch to (b) pivotal movement of the end of said first portion of said arm contacted by said cam body is about 13 to 1.

9. The method of claim 1 further comprising rotating said shaft by an additional or fewer number of steps to correct, based on trial and error, for inaccuracies in the determination of the first and second angular positions.

10. An apparatus for rotationally orienting an armature shaft having an eccentric cam body extending axially from one end thereof so that said cam body has a desired angular orientation relative to the axis of rotation of said shaft, comprising:

a rotatable collet mechanism biased to grip said armature shaft;

a motor having an output shaft movable in discrete increments or steps, said output shaft being drivingly connected to said collet mechanism to rotate said collet mechanism and said armature shaft gripped thereby so that an imaginary reference point on the periphery of said cam body is rotated to first and second angular positions;

a detecting mechanism located adjacent said collet mechanism for detecting when said reference point reaches said first and second angular positions;

a programmable controller (1) connected to and communicating with said motor and said detecting mechanism for controlling said motor and determining the number of motor steps necessary to rotate said armature shaft so that said reference point moves from said first to said second angular positions, (2) computing the number of motor steps the shaft must be rotated from the second angular position to the final angular position, and (3) controlling said motor so that said cam body has said desired angular orientation relative to said axis of rotation.

11. The apparatus of claim 10 wherein said detecting mechanism comprises:

a pivotable L-shaped arm located adjacent said collet mechanism having a first portion at least transiently contacted by said cam body when said armature shaft is received in said collet mechanism, said arm being pivoted by said cam body when said armature shaft is rotated; and a proximity switch located remote from said first portion and adjacent a second portion of said arm.

12. The apparatus of claim 11 further comprising an actuator which temporarily pivots said L-shaped arm to facilitate placement of said armature shaft in said collet mechanism.

13. The apparatus of claim 11 wherein the end of said second portion of said L-shaped arm adjacent said proximity switch is pivoted away from and toward said proximity switch by said cam body when said collet mechanism and said armature shaft are rotated between said first position and said second position and wherein the ratio of (a) pivotal movement of the end of said second portion adjacent said proximity switch to (b) pivotal movement of the end of said first portion of said arm contacted by said cam body is about 13 to 1.

14. The apparatus of claim 11 wherein said proximity switch detects the proximity of an end of said second portion of said arm to said proximity switch.

15. The apparatus of claim 11 further comprising:

an armature shaft placing arm;

a movable carriage mounted on said armature shaft placing arm; and wherein said collet mechanism and said motor are mounted on said carriage.

16. The apparatus of claim 15 wherein the end of said second portion of said L-shaped arm adjacent said proximity switch is pivoted away from and toward said proximity switch by said cam body when said collet mechanism and said armature shaft are rotated between said first position and said second position and wherein the ratio of (a) pivotal movement of the end of said second portion adjacent said proximity switch to (b) pivotal movement of the end of said first portion remote from the pivot point of said arm is about 13 to 1.

17. The apparatus of claim 15 wherein said armature shaft placing arm is rotatable between a horizontal position and a vertical position and said apparatus further comprises an actuator for rotating said armature shaft placing arm between said horizontal position and said vertical position.

18. The apparatus of claim 17 wherein said carriage is movable when said armature shaft placing arm is in said vertical position to place at least a portion of the armature shaft gripped by said collet mechanism into an aperture in a stack of armature laminations.

19. The apparatus of claim 10 further comprising:

an armature shaft placing arm;

a movable carriage mounted on said armature shaft placing arm; and wherein said collet mechanism and said motor are mounted on said carriage.

20. The apparatus of claim 19 wherein said armature shaft placing arm is rotatable between a horizontal position and a vertical position and said apparatus further comprises an actuator for rotating said armature shaft placing arm between said horizontal position and said vertical position.

21. The apparatus of claim 20 wherein said carriage is movable when said armature shaft placing arm is in said vertical position to place at least a portion of the armature shaft gripped by said collet mechanism into an aperture in a stack of armature laminations.

22. The apparatus of claim 10 further comprising:

a push rod movable into engagement with said armature shaft, said push rod having a projection extending from the armature shaft engaging end thereof which is received in a depression in the cam body of said armature shaft; and an actuator attached to said push rod and cooperating with said push rod to insert said armature shaft into said collet mechanism.

23. The apparatus of claim 22 wherein said push rod remains engaged with said armature shaft when said collet mechanism and said armature shaft gripped thereby are rotated by said motor.

24. The apparatus of claim 22 wherein a portion of said projection closest to the end of said push rod is generally cylindrical and a portion of said projection remote from the end of said push rod is generally conical.

25. The apparatus of claim 22 wherein said push rod is smaller in diameter than said armature shaft.

26. An apparatus for practicing the method of claim 1, comprising:

a rotatable collet mechanism biased to grip said armature shaft;

a motor having an output shaft movable in discrete increments or steps, said output shaft being drivingly connected to said collet mechanism to rotate said collet mechanism and said armature shaft gripped thereby so that an imaginary reference point on the periphery of said cam body is rotated to first and second angular positions;

a detecting mechanism located adjacent said collet mechanism for detecting when said reference point reaches said first and second angular positions;

a programmable controller (1) connected to and communicating with said motor and said detecting mechanism for controlling said motor and determining the number of motor steps necessary to rotate said armature shaft so that said reference point moves from said first to said second angular positions, (2) computing the number of motor steps the shaft must be rotated from the second angular position to the final angular position, and (3) controlling said motor so that said cam body has said desired angular orientation relative to said axis of rotation.

* * * * *